US008916031B2

(12) United States Patent
Fuenzalida Diaz et al.

(10) Patent No.: US 8,916,031 B2
(45) Date of Patent: Dec. 23, 2014

(54) RECOVERY OF TETRACOSANOL FROM A MIXTURE DERIVED FROM TALL OIL PITCH

(75) Inventors: Miguel Angel Fuenzalida Diaz, Las Condes (CL); Alejandro Markovits Rojas, Las Condes (CL); Miriam Berrios Cornejo, Quilcura (CL); Mabel Keller Mena, Valparaiso (CL); Jose Rodrigo Vergara Salinas, Valsparaiso (CL); Glenda Cea Barcia, Valparaiso (CL); Andres Illanes Frontaura, Valparaiso (CL); Rolando Arturo Chamy Maggi, Valparaiso (CL); Andres Markovits Schersl, Valparaiso (CL); Araceli Olivares Miralles, Valparaiso (CL)

(73) Assignees: Pontificia Universidad Catolica de Valparaiso (CL); Harting S.A. (CL)

( * ) Notice: Subject to any disclaimer, the term of this patent is extended or adjusted under 35 U.S.C. 154(b) by 627 days.

(21) Appl. No.: 13/320,186

(22) PCT Filed: May 10, 2010

(86) PCT No.: PCT/IB2010/052054
§ 371 (c)(1),
(2), (4) Date: Feb. 13, 2012

(87) PCT Pub. No.: WO2010/131184
PCT Pub. Date: Nov. 18, 2010

(65) Prior Publication Data
US 2012/0125762 A1    May 24, 2012

(51) Int. Cl.
*B01D 1/24*    (2006.01)
*B01D 3/14*    (2006.01)

(52) U.S. Cl.
CPC ........................................ *B01D 1/24* (2013.01)
USPC ................ 203/48; 203/57; 530/205; 568/913

(58) Field of Classification Search
USPC .................. 203/47, 48, 57; 530/205; 568/913
See application file for complete search history.

(56) References Cited

U.S. PATENT DOCUMENTS

| | | | |
|---|---|---|---|
| 6,297,353 B1 | 10/2001 | Fuenzalida Diaz et al. | |
| 6,465,665 B1 * | 10/2002 | Schersl | 552/545 |
| 6,683,116 B1 | 1/2004 | Jia et al. | |
| 8,318,962 B2 * | 11/2012 | Kang et al. | 552/545 |
| 8,450,453 B2 * | 5/2013 | Hamunen | 530/208 |
| 2006/0166951 A1 | 7/2006 | Sanbom | |

FOREIGN PATENT DOCUMENTS

| | | |
|---|---|---|
| EP | 0 952 208 | 10/1999 |
| ES | 2 242 582 | 11/2005 |

* cited by examiner

*Primary Examiner* — Nina Bhat
*Assistant Examiner* — Jonathan Miller
(74) *Attorney, Agent, or Firm* — Merchant & Gould P.C.

(57) ABSTRACT

Described is a process to obtain tetracosanol from a complex mixture derived from tall oil pitch that comprises terpenoids, rosin alcohols, rosin aldehydes, aliphatic alcohols, hydrocarbons and stilbene derivatives. The process comprises a mixture crystallization step from hexane and a fractional distillation of the crystallized solids, which yields tetracosanol with more than 90% purity.

6 Claims, No Drawings

RECOVERY OF TETRACOSANOL FROM A MIXTURE DERIVED FROM TALL OIL PITCH

This application is a National Stage Application of PCT/IB2010/052054, filed 10 May 2010, which claims benefit of Serial No. 1166-2009, filed 13 May 2009 Chile and which applications are incorporated herein by reference. To the extent appropriate, a claim of priority is made to each of the above disclosed applications.

The present invention relates to a process for recovery of tetracosanol from light neutral matter, a distillate fraction of tall oil pitch.

BACKGROUND OF THE INVENTION

Tall oil pitch is a sub-product or residue of tall oil distillation used to obtain fatty acids and rosin acids. Tall oil is obtained from black liquor soaps. These soaps are a sub-product of the Kraft pulping process for conifer trees. Conifer wood, especially pine wood, contains free rosin acids, fatty acids, mostly as triglycerides, a series of non-saponifiable compounds and volatile terpenes. During the pulping process, said compounds are separated from wood. Glycerides of fatty acids and rosin acids are saponified by the alkaline heated liquid and the resulting soaps are dissolved in the pulping liquor. After the digestion the pulping liquor is concentrated and sodium soaps of these mixed acids accumulate at the surface together with neutral compounds. The complex mixture denominated black liquor soaps or tall oil soaps can be separated from the surface. This material, which comprises between 50 and 70% of solids, can be used as fuel or acidified, which yields crude tall oil (CTO). In turn, CTO can be used as fuel or as a source of a series of chemicals.

Black liquor soaps constitute a complex mixture formed by sodium salts of fatty acids, rosin acids, which form the saponifiable fraction of the mixture, and a series of other compounds such as sterols, fatty alcohols or polycosanols, mono- and diterpenes, which together form the non-saponifiable or neutral fraction of black liquor soaps. Treating these soaps with diluted sulfuric acid converts the sodium salts into free fatty acids and rosin acids. Consequently, an aqueous phase containing sodium sulfate and an oil phase containing the remaining components are formed. The oil phase separated from the aqueous phase is denominated "tall oil".

Tall oil is used to obtain industrial fatty acids known as TOFA (tall oil fatty acids) in the technical literature and rosin acids known as TORA (tall oil rosin acids), which have broad commercial applications. TORA and TOFA are obtained from fractioned distillation under vacuum of tall oil. The distillation bottom or "pitch", which contain most of the non-saponifiable compounds, have been used as fuel or for preparing asphaltic emulsions.

However, pitch value has increased recently due to a novel process to recover pitch sterols that has been commercially implemented (Arboris LLC). This process has been disclosed in the U.S. Pat. No. 6,297,353. One of the sub-products of the process, denominated light neutral matter, contains significant amounts of tetracosanol. Tetracosanol is by itself a product useful in detergent formulations, but most importantly it can be a convenient raw material for the production of tetracosanoic acid or lignoceric acid, which is an excellent moisturizing agent for shampoos, and cosmetic creams and lotions.

Consequently, the object of the present invention is the development of a process for recovery of tetracosanol from light neutral matter.

Composition of Light Neutral Matter

Light neutral matter is a complex mixture of chemicals with different characteristics, among which about forty chemical compounds have been identified, such as sterols, diterpenoids, monoterpene alcohols, diterpenic aldehydes, long chain aliphatic alcohols, steroid alcohols, hydrocarbons and stilbene-derived compounds. Table 1 shows the components of light neutral matter, a typical average composition and the variation range of its components. Said variability is due to the variability of the raw material used for cellulose production as well as to variations in process conditions, but it has been observed that tetracosanol is not always present among the main components.

TABLE 1

Components, typical average composition and composition range of light neutral matter.

| Component | Average composition (%) | Composition range (%) |
|---|---|---|
| 13-Epimanool | 0.19 | 0.01-15 |
| 8(17),E-13-epimanoyl-15-ol | 0.54 | 0.01-15 |
| Abietadiene | 0.78 | 0.01-15 |
| Abietal | 3.28 | 0.1-15 |
| Abietol | 0.98 | 0.1-15 |
| Agatadiol | 6.29 | 0.1-55 |
| Beta sitostanol | 0.33 | 0-20 |
| Beta sitosterol | 2.14 | 0-20 |
| Campestanol | 0.01 | 0-20 |
| Campesterol | 0.06 | 0-20 |
| Dehydroabietadiene | 0.39 | 0.01-15 |
| Dehydroabietal | 1.78 | 0.1-15 |
| Dehydroabietol | 0.57 | 0.01-15 |
| Docosanol | 2.58 | 0.1-50 |
| Eicosanol | 0.25 | 0.1-30 |
| Stigmasterol | 0.01 | 0-20 |
| Geranylgeraniol | 1.80 | 0.1-15 |
| Heneicosanol | 1.06 | 0.01-30 |
| Hexacosanol | 4.32 | 0.1-51 |
| Isoagatadiol | 8.65 | 0.1-55 |
| Isopimaradiene | 1.90 | 0.1-15 |
| Isopimaral | 7.14 | 0.1-50 |
| Isopimarol | 7.03 | 0.1-50 |
| Manool | 0.38 | 0.01-15 |
| Neoabietadiene | 0.20 | 0.01-15 |
| Neoabietal | 0.60 | 0.01-15 |
| Neoabietol | 0.20 | 0.01-15 |
| Octacosanol | 1.26 | 0.1-40 |
| Palustral | 0.20 | 0.01-15 |
| Pentacosanol | 1.08 | 0.01-30 |
| Pimaradiene | 1.40 | 0.1-15 |
| Pimaral | 6.08 | 0.1-50 |
| Pimarol | 6.32 | 0.1-30 |
| Sandaracopimaral | 0.39 | 0.01-15 |
| Sandaracopimaradiene | 0.20 | 0.01-15 |
| Sandaracopimarol | 0.60 | 0.01-15 |
| Squalene | 0.41 | 0.01-15 |
| Terpineol | 0.60 | 0.01-15 |
| Tetracosanol | 10.58 | 0.1-60 |
| trans-Comunal | 0.60 | 0.01-15 |
| trans-Comunol | 6.96 | 0.1-45 |
| trans-Pinosylvin dimethyl ester | 9.21 | 0.1-50 |
| Tricosanol | 0.65 | 0.1-20 |

Notwithstanding the complex nature of light neutral matter, a surprisingly simple process has been found for the recovery of tetracosanol from light neutral matter, comprising the steps of:

a) forming a mixture by contacting light neutral matter with hexane and heating said mixture to form a solution of light neutral matter in hexane;

b) cooling down said solution to 10° C. or less to form a solid phase and a liquid phase;

c) separating the solid phase from the liquid phase; and d) fractionating the solid phase through distillation to obtain a fraction comprising tetracosanol.

DETAILED DESCRIPTION OF THE PROCESS

Light neutral matter is mixed with hexane and the mixture is heated until a solution of light neutral matter in hexane is formed. Heating can be carried out either by heating the mixture under reflux in a vessel at the usual hexane boiling point or at a higher temperature in a pressurized vessel.

When the solution is obtained under reflux in a transparent vessel, the formation of said solution can be visually assessed observing the transition from a turbid mixture to a crystalline solution.

In those cases when no visual detection of the solution formation is possible, either because reflux heating is carried out in a non-transparent vessel or in a pressurized vessel, sample heating for a given hexane/light neutral matter mass ratio is kept during a time interval at least equal to the time necessary to form a solution for the same hexane/light neutral matter mass ratio determined under reflux in a transparent vessel. When heating is carried out under reflux and with a hexane/light neutral matter mass ratio between 3 and 1, the solution is obtained in at most 10 minutes of heating from the beginning of the boiling.

After the solution is formed, said solution is cooled down to 10° C. or less and kept at said temperature during at least 8 minutes, until a solid phase and a liquid phase form, which are separated through filtration, and the solid phase is washed with hexane and dried.

Surprisingly, it has been found that the solid phase obtained as described above, comprises almost exclusively (99.6%) by long chain aliphatic alcohol present in light neutral matter. Moreover, tetracosanol recovery has a 90% yield, while docosanol or hexacosanol are recovered with a yield of 77 and 48%, respectively, as shown in Example 1.

To recover high purity tetracosanol from the solid phase obtained as described before, said solid phase is fractionated in a distillation column and the purest fraction is collected, which can comprise 90% by weight or more of tetracosanol. Although someone skilled in the art will have no difficulties to experimentally determine the conditions to obtain the tetracosanol-richest fraction, either in a continuous or batch distillation, Example 2 illustrates the case of a fractional batch distillation in a laboratory column.

Example 1

Crystallization of Light Neutral Matter 600 g of light neutral matter and 1800 g of hexane were mixed in a 4 L Erlenmeyer flask provided with a reflux condenser and heated over a heating plate under reflux during 35 minutes until a solution was obtained. The long chain aliphatic alcohol composition of the light neutral matter was: 8.2% docosanol; 10.63% tetracosanol; 1.56% hexacosanol and 1.37% octacosanol, which adds up to 21.8% of long chain aliphatic alcohols. Since former experiences showed that the crystallized fraction obtained through the process of the invention contains almost exclusively aliphatic alcohols independently from the relative amount of other constituents of light neutral matter, these other constituents were not separately analyzed.

The solution was then put on ice until its temperature dropped to 10° C., when crystal formation was observed. The solid-liquid suspension was filtered through No. 1 Whatman filter paper in a Büchner funnel with vacuum, and the filtrate was washed with hexane. The resulting solids were dried in a vacuum drying oven at 40° C. and 350 mbar. 104 g of solid residues were obtained, a yield of 79.51% with respect to the total content of aliphatic alcohols in the light neutral matter.

The relative alcohol composition of the crystallized mixture was: 36.3% docosanol; 55.5% tetracosanol; 4.9% hexacosanol and 3.3% octacosanol. Said composition is related to the following recovery yields for each individual alcohol: 77% docosanol; 90.6% tetracosanol; 53% hexacosanol and 41% octacosanol. The analysis of alcohols in the samples was performed as described below.

Analysis of Crystallized Solids

Long chain aliphatic alcohols in solvent-free crystals were determined using an HP 6890 gas chromatographer with autosampler, provided with a HP-5 column (30 m×0.25 mm of diameter×0.25 μm) and a flame ionization detector operating in split mode (30:1). The injector temperature was set at 300° C. and the detector temperature was set at 320° C. The initial temperature of the column was 160° C. and was increased at a rate of 5° C./min, and keeping the isotherm for 10 minutes. The carrier gas was helium with constant flow (1 mL/min).

Derivatization of Samples for Analysis

Between 400 and 500 mg of sample are weighed in a scintillation vial with 20 to 30 mg of cholesterol as an internal standard. Subsequently, 15 mL of chloroform were added and the mixture was vortexed or sonicated if necessary to dissolve the components. 500 μL were transferred to a chromatography vial and evaporated under nitrogen. Then, 300 μL of sylanizing reactant (Bis (trimethyl) silyl trifluoroacetamide) and 400 μL of pyridine were added. The vial was closed and heated for 15 minutes, stirred again and 1.0 μL was injected into the chromatograph.

From the chromatographic report, peaks of the different alcohols were identified by comparison to the retention times of corresponding standards with purities of 99% or more, and weight percentages were calculated for each species.

Example 2

Fractional Distillation of the Crystallized Sample

A batch distillation system was used, with the following characteristics:
- 120 cm long, 24/40 double grounded-glass distillation column, Ace Glass, USA.
- Saddle-type striated laminar steel packing with a surface area of 1 squared cm per saddle.
- Column heating mantle with three independent 225 W sections, each with a potentiometric regulator, Glass-Col, USA.
- Variable reflux condensation head with 24/40 grounded-glass connections, Kontes, USA.
- Rotary condensate receiver with five 24/40 grounded-glass connections and four outlets, Kontes, USA.
- Two flexible 938 W heating tapes for the condenser, Thermolyne.
- Electromagnetic controller, Kontes.
- 500 mL round-bottomed distillation flask (reboiler) with two 24/40 female mouths, Schott Duran, Germany.
- 190 W heating mantle for the reboiler mouth with potentiometric regulator, Quimis Aparelhos Cientificos, Brazil.
- 200 W heating mantle for the reboiler round-bottomed flask with potentiometric regulator, Glass-Col, USA.
- RZ 8 370 W rotary vacuum pump, 8.6/9.9 cubic meters per hour, Trivac.
- GFK 1000i cold trap, Vaccubrand.

Procedure 100 g of the solids obtained according to Example 1 were loaded into the distillation flask and the system was exhausted using the vacuum pump to a pressure of 0.4 mbar, when solid heating was started. Solids melted and boiled at 240° C. The condenser head temperature was 70° C. Total reflux was maintained during one hour and then a reflux ratio of 3:1 (reflux/distillate) was used. Distillate fraction collection was started at this moment. After 4.5 hours operating with said reflux ratio, the boiling temperature in the reboiler was 220° C. and in these conditions the distillate contained 34.7% of tetracosanol. After 1.5 additional operation hours the temperature reached 300° C. and the operation was stopped. In these last 1.5 hours, 43.4 g of distillate were obtained with a tetracosanol content of 90.2% and a recovery yield of 78.1%.

For distillation operation systems that are different from those described in Example 2, someone skilled in the art will be able to determine by routine trials the conditions to obtain fractions with high tetracosanol contents from tetracosanol-containing mixtures of long chain aliphatic alcohols.

The invention claimed is:

1. A process to obtain tetracosanol from a tetracosanol-containing matter composition wherein said tetracosanol-containing matter composition comprises:

| | |
|---|---|
| 13-Epimanool | 0.01-15% |
| 8(17),E-13-epimanoyl-15-ol | 0.01-15% |
| Abietadiene | 0.01-15% |
| Abietal | 0.1-15% |
| Abietol | 0.1-15% |
| Agatadiol | 0.1-55% |
| Beta sitostanol | 0-20% |
| Beta sitosterol | 0-20% |
| Campestanol | 0-20% |
| Campesterol | 0-20% |
| Dehydroabietadiene | 0.01-15% |
| Dehydroabietal | 0.1-15% |
| Dehydroabietol | 0.01-15% |
| Docosanol | 0.1-50% |
| Eicosanol | 0.1-30% |
| Stigmasterol | 0-20% |
| Geranylgeraniol | 0.1-15% |
| Heneicosanol | 0.01-30% |
| Hexacosanol | 0.1-51% |
| Isoagatadiol | 0.1-55% |

-continued

| | |
|---|---|
| Isopimaradiene | 0.1-15% |
| Isopimaral | 0.1-50% |
| Isopimarol | 0.1-50% |
| Manool | 0.01-15% |
| Neoabietadiene | 0.01-15% |
| Neoabietal | 0.01-15% |
| Neoabietol | 0.01-15% |
| Octacosanol | 0.1-40% |
| Palustral | 0.01-15% |
| Pentacosanol | 0.01-30% |
| Pimaradiene | 0.1-15% |
| Pimaral | 0.1-50% |
| Pimarol | 0.1-30% |
| Sandaracopimaral | 0.01-15% |
| Sandaracopimaradiene | 0.01-15% |
| Sandaracopimarol | 0.01-15% |
| Squalene | 0.01-15% |
| Terpineol | 0.01-15% |
| Tetracosanol | 0.1-60% |
| trans-Comunal | 0.01-15% |
| trans-Comunol | 0.1-45% |
| trans-Pinosylvin dimethyl ester | 0.1-50% |
| Tricosanol | 0.1-20% | and wherein the process comprises the steps of:
a) forming a mixture by contacting said matter composition with hexane and heating said mixture to form a solution of said matter composition in hexane;
b) cooling down said solution to 10° C. or less to form a solid phase and a liquid phase;
c) separating the solid phase from the liquid phase; and
d) fractionating the solid phase through distillation to obtain a fraction comprising tetracosanol.

2. A process according to claim 1 wherein the hexane/matter composition mass ratio is 1:3.

3. A process according to claim 1 wherein the mixture of hexane and said matter composition is heated under reflux.

4. A process according to claim 1 wherein the mixture of hexane and said matter composition is heated at a temperature higher than the normal hexane boiling point.

5. A process according to claim 1 wherein said solid phase is distilled in a packed column at a pressure of 1 mbar or lower.

6. A process according to claim 1, wherein said distilled fraction comprises at least 90% by weight of tetracosanol.

* * * * *